(12) United States Patent
Hokkirigawa et al.

(10) Patent No.: US 6,395,677 B1
(45) Date of Patent: May 28, 2002

(54) MATERIAL FOR BEARING RETAINER

(75) Inventors: Kazuo Hokkirigawa, Yonezawa; Rikuro Obara; Motoharu Akiyama, both of Nagano-ken, all of (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/990,431

(22) Filed: Nov. 21, 2001

(30) Foreign Application Priority Data

Dec. 15, 2000 (JP) ........................................ 2000-382236

(51) Int. Cl.⁷ .......................... B01J 20/26; B01J 20/00; C01B 31/00
(52) U.S. Cl. .................... 502/402; 264/29.1; 264/29.5; 264/29.4; 264/29.7; 423/447.4; 423/447.9; 522/404; 521/84.1
(58) Field of Search .................. 521/84.1; 502/402, 502/404; 264/29.1, 29.4, 29.5, 29.7; 423/447.4, 447.9

(56) References Cited

U.S. PATENT DOCUMENTS 3,927,157 A  * 12/1975 Vasterling ..................... 264/29
4,306,059 A  * 12/1981 Yokobayashi et al. ......... 536/1
6,124,028 A  *  9/2000 Nagle ....................... 428/312.6

OTHER PUBLICATIONS

"Development of Hard and Porous Carbon Material 'RB Ceramics' Using Rice Bran as a Starting Material", and English translation thereof, *Zairyou Kagaku* (Functional Materials), vol. 17, No. 6, May 1997, pp. 24–28.

* cited by examiner

*Primary Examiner*—Morton Foelak
(74) *Attorney, Agent, or Firm*—Flynn, Thiel, Boutell & Tanis, P.C.

(57) ABSTRACT

There is provided a porous material suitable for use in a bearing retainer, having such properties as a small contraction ratio of the dimensions of a formed workpiece to those of a finished product, excellent hot oil resistance, small contraction change, insusceptibility to damage, light weight, a long service life, and ability to retain oil and grease for a long period of time. The porous material suitable for use in the bearing retainer is obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture after fired into carbonized powders sieved through a 60-mesh screen, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

6 Claims, No Drawings

MATERIAL FOR BEARING RETAINER

BACKGROUND OF THE INVENTION

1. Field of the Invention

The present invention relates to a porous material suitable for use in a bearing retainer, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a 60-mesh screen, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

2. Description of the Related Art

Glass-fiber reinforced polyamide such as Nylon 66 reinforced by glass fiber, metal, and so forth have been in widespread use up to now as material for a retainer of bearings such as ball bearings, taper bearings, and so forth. As a lubricating oil such as oil, grease, and the like is used for these bearings, a hot-oil-resistant Nylon 66 blended with a lubricating-oil resistant-stabilizer has been used for Nylon 66 for use in retainers.

However, even such a hot-oil-resistant Nylon 66 has been unable to withstand applications thereof at a high temperature on a long term basis, and accordingly, various improvements have been attempted.

Meanwhile, an attempt to obtain a porous carbonaceous material by utilizing rice bran, discharged in quantity of 90,000 tons a year in Japan, and as much as 33 million tons throughout the world, has been well known by researches carried out by Mr. Kazuo HOEKIRIGAWA, the first inventor of the present invention (refer to "Functional Material", May issue, 1997, Vol. 17, No. 5, pp. 24~28).

Herein are disclosed a carbonaceous material obtained by mixing and kneading degreased bran derived from rice bran with a thermosetting resin, drying a formed kneaded mixture prepared by pressure-forming, and fang the formed kneaded mixture as dried in an inert gas, and a method of forming the same.

With such a method as described above, however, it has been practically difficult to form the formed kneaded mixture with precision because there occurs discrepancy in dimensions by as much as 25% in terms of a contraction ratio of the dimensions of the formed kneaded mixture prepared by the pressure-forming to those of a finished formed product obtained after the firing in the inert gas.

SUMMARY OF THE INVENTION

The invention has been developed to solve the problem described above, and it is therefore an object of the invention to provide a porous material suitable for use in a bearing retainer, having such properties as a small contraction ratio of the dimensions of a formed workpiece to those of a finished product, excellent hot oil resistance, small thermal strain, insusceptibility to damage, light weight, a long service life, and ability to retain oil and grease for a long period of time, thereby providing a high-tech eco-material (state-of-the-art material excellent in ecological adaptability) utilizing biomass resources, different from conventional industrial material.

The inventors have been successful in development of a porous material suitable for use in fabricating a high-precision bearing retainer, having excellent properties as a material for use in fabricating a bearing retainer, and a small contraction ratio of the dimensions of a formed workpiece to those of a finished product.

The inventor of the present invention has conducted intense studies, and found out that a porous material is obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a 60-mesh screen, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C., and the porous material thus obtained has not only ideal properties as a material suitable for use in a bearing retainer but also a small contraction ratio of the dimensions of a formed workpiece to those of a finished product.

More specifically, the porous material described above has the contraction ratio of the dimensions of the formed workpiece to those of the finished product as low as 3% or less, 13 wt % of oil retention characteristic, $4.85 \times 10^{-3}$ Ωcm of volume resistivity, and density in a range of 1.05 to 1.3 $g/cm^3$, and further, it has been possible to obtain the porous material having suitable hardness, and still friction coefficient in the order of about 1.05 after fired at a high temperature.

DESCRIPTION OF THE PREFERRED EMBODIMENTS

Degreased bran derived from rice bran, used in carrying out embodiments of the present invention, may be either of domestic origin or of foreign origin regardless of the kind of rice.

Further, any thermosetting resin may be used as long as it has thermosetting property, and typically cited as a thermosetting resin are a phenol resin, diaryl phthalate resin, unsaturated polyester resin, epoxy resin, polyimide resin, and triazine resin. In particular, the phenol resin is preferably used.

Furthermore, a thermoplastic resin such as polyamide, and so forth can be used in combination with a thermosetting resin provided that it is done without departing from the spirit and scope of the invention. A proportion of the thermoplastic resin substituted for a portion of the thermosetting resin to the thermosetting resin is normally not more than 50 parts to 100 parts by weight.

A mixing ratio of the degreased bran to the thermosetting resin is 50~90:50~10 by weight, however, a ratio of 75:25 is preferably used.

The thermosetting resin used in this case is preferably in a liquid state, having a relatively small molecular weight.

A primary firing is applied at a temperature in a range of 700 to 100° C. using normally a rotary kiln for a firing time in a range of 40 to 120 minutes.

A mixing ratio of carbonized powders obtained after the primary firing to the thermosetting resin is 50~90:50~10 by weight, however, a ratio of 75:25 is preferably used.

A kneaded mixture of the carbonized powders after the primary firing and the thermosetting resin is pressure-formed at a pressure in a range of 20 to 30 MPa, preferably in a range of 22 to 25 MPa. A mold is preferably at a temperature of about 150° C.

The thermoplastic resin can be substituted for a portion of the thermosetting resin, and in such a case, a mixing ratio is normally not more than 50 parts of the thermoplastic resin to 100 parts of the thermosetting resin by weight.

A heat treatment is applied at a temperature in a range of 100 to 1100° C. normally in a well-controlled electric furnace. Heat treatment time ranges from about 60 to 360 minutes. A warming rate up to a heat treatment temperature is required to be relatively moderate up to 500° C. In more specific terms, the warming rate is in a range of 0.5 to 2° C./min, preferably 1° C./min.

Further, in lowering temperature after the heat treatment, a relatively moderate cooling rate is required up to 500° C. Upon temperature dropping to 500° C. or lower, a formed kneaded mixture is left to cool by itself. In more specific terms, a cooling rate is in a range of 0.5 to 4° C./min, preferably 1° C./min. Furthermore, for an inert gas, any of helium, argon, neon, and nitrogen gas may be used, however, nitrogen gas is preferably used.

Embodiments of the invention are summed up as follows:

(1) a porous material suitable for use in a bearing retainer, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a 60-mesh screen, mixing the carbonized powders with the thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.;

(2) the porous material suitable for use in the bearing retainer as described under item (1) above, wherein the thermosetting resin is one kind or not less than two kinds selected from the group consisting of a phenol resin, diaryl phthalate resin, unsaturated polyester resin, epoxy resin, polyimide resin, and triazine resin;

(3) the porous material suitable for use in the bearing retainer as described under item (1) or (2) above, wherein a mixing ratio of the degreased bran to the thermosetting resin is 50~90:50~10 by weight;

(4) the porous material suitable for use in the bearing retainer as described under any one of items (1) to (3) above, wherein a mixing ratio of the carbonized powders to the thermosetting resin is 50~90:50~10 by weight;

(5) the porous material suitable for use in the bearing retainer as described under any one of items (1) to (4) above, wherein a particle size of the carbonized powders is in a range of 50 to 250 $\mu$m;

(6) the porous material suitable for use in the bearing retainer as described under any one of items (1) to (5) above, wherein the thermosetting resin mixed with the degreased bran is in a liquid state, and the thermosetting resin mixed with the carbonized powders is in a solid state;

(7) a process of producing a porous material suitable for use in a bearing retainer, comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a 60-mesh screen, mixing the carbonized powders with a thermosetting resin before kneading, pressure-forming a kneaded mixture thus obtained at a pressure in a range of 20 to 30 MPa, applying a heat treatment again to a formed kneaded mixture in the inert gas at a temperature in a range of 100 to 1100° C., and cooling the formed kneaded mixture at a moderate cooling rate;

(8) the process of producing a porous material suitable for use in the bearing retainer, as described under item (7) above, wherein the moderate cooling rate is in a range of 1 to 4° C./min up to 500° C.;

(9) the process of producing a porous material suitable for use in the bearing retainer, as described under item (7) or (8) above, wherein the primary firing is applied in a rotary kiln; and

(10) the process of producing a porous material suitable for use in the bearing retainer, as described under any one of items (7) to (9) above, wherein the inert gas is nitrogen gas.

EMBODIMENTS

The invention is described in further detail hereinafter based on preferred embodiments.

(Examples 1 to 7 of the process of producing the porous material for use in the bearing retainer)

75 g of degreased bran derived from rice bran was mixed and kneaded with 25 g of a phenol resin (resol) in a liquid state while heating both at a temperature in a range of 50~60° C. A homogeneous mixture having plasticity was thereby obtained.

The mixture was then fired at 900° C. in a nitrogen atmosphere inside a rotary kiln for 60 minutes. A carbonized fired mixture thus obtained was pulverized by use of a crusher, and subsequently, was sieved through a screen of 60-mesh, thereby obtaining carbonized powders of particle size in a range of 50~250 $\mu$m.

75 g of the carbonized powders thus obtained was mixed and kneaded with 25 g of a phenol resin (resol) in a solid state while heating both at a temperature in a range of 100~150° C. A homogeneous mixture having plasticity was thereby obtained.

Subsequently, a plastic mixture was pressure-formed into the shape of a retainer at a pressure of 22 MPa. A mold was at a temperature of 150° C.

A formed mixture was taken out of the mold, heated in a nitrogen atmosphere at a warming rate of 1° C./min up to 500° C., held at 500° C. for 60 min, and sintered at 900° C. for about 120 min.

Subsequently, the temperature of the formed mixture was lowered at a cooling rate in a range of 2 to 3° C./min up to 500° C., and upon the temperature dropping to 500° C. or lower, the formed mixture was left to cool by itself.

Table 1 shows various conditions of the process of producing the porous material for use in the bearing retainer.

TABLE 1

|  | ex. 1 | ex. 2 | ex. 3 | ex. 4 | ex. 5 | ex. 6 | ex. 7 | conv. ex. |
|---|---|---|---|---|---|---|---|---|
| mix. amt. (g) |  |  |  |  |  |  |  |  |
| degr'd bran | 75 | 75 | 75 | 80 | 60 | 55 | 85 | 75 |
| t-sett. resin | 25 | 25 | 25 | 20 | 40 | 35 | 15 | 25 |
| prim. |  |  |  |  |  |  |  |  |
| firing (° C.) | 900 | 900 | 900 | 850 | 1000 | 1000 | 800 | — |
| time (min) | 60 | 60 | 60 | 60 | 70 | 70 | 60 | — |
| aver. particle size ($\mu$m) | 90 | 90 | 90 | 40 | 120 | 50 | 130 | — |
| mix. amt. (g) |  |  |  |  |  |  |  |  |
| c.powder | 75 | 75 | 75 | 75 | 75 | 80 | 85 | — |
| t-sett. resin | 25 | 25 | 25 | 25 | 25 | 20 | 15 |  |
| form. press. MPa | 21.5 | 22.5 | 24.5 | 23.5 | 29.5 | 20.5 | 23.5 | 23.5 |
| heat treat. (° C.) | 900 | 200 | 300 | 800 | 1000 | 1100 | 900 | 900 |
| firing time (hr.) | 120 | 100 | 130 | 120 | 100 | 90 | 120 | 120 |
| warm. rate | 1 | 1.5 | 1 | 1.5 | 2 | 1 | 1 | 1 |

TABLE 1-continued

|  | ex. 1 | ex. 2 | ex. 3 | ex. 4 | ex. 5 | ex. 6 | ex. 7 | conv. ex. |
|---|---|---|---|---|---|---|---|---|
| cool. rate | 2 | left to cool | left to cool | 2 | 3 | 2 | 2 | 2 |
| atm. | nitrogen | nitrogen | nitrogen | nitrogen | nitrogen | nitrogen | nitrogen | nitrogen |

Remarks:
a unit of a warming rate and a cooling rate, respectively, is ° C./min.
abbreviation:
ex. 1 = example 1;
conv. ex. = conventional example;
mix. amt. = mixed amount;
degr'd bran = degreased bran;
t-sett. resin = thermosetting resin;
c. powder = carbonized powders;
form. press. = forming pressure;
heat treat. = heat treatment temperature;
warm. rate = warming rate; and
cool rate = cooling rate.
"left to cool" means "left to cool by itself".

Table 2 shows properties of the porous material suitable for use in the bearing retainer, produced according to the examples of production, 1 to 7, and a conventional example.

TABLE 2

|  | ex. 1 | ex. 2 | ex. 3 | ex. 4 | ex. 5 | ex. 6 | ex. 7 | conv. ex. |
|---|---|---|---|---|---|---|---|---|
| d. c. ratio (%) | 2.0 | 2.5 | 2.4 | 1.9 | 1.8 | 1.75 | 1.25 | 25 |
| c. s. (MPa) | 103 | 150 | 140 | 95 | 110 | 115 | 95 | 60 |
| oil ret. wt % | 13.3 | 9.8 | 10.0 | 14.1 | 12.8 | 12.8 | 14.5 | 13.5 |
| vol. res'st. ($10^{-3}$ Ω cm) | 4.85 | 49.0 | 47.5 | 6.2 | 5.9 | 3.1 | 4.9 | 1.4 |
| fr'ctn coeff. ($\mu$) | 0.15 | 0.18 | 0.16 | 0.19 | 0.21 | 0.13 | 0.15 | 0.19 |
| hyg'oscop. wt % | 2.5 | 1.7 | 1.8 | 2.0 | 2.1 | 2.1 | 2.1 | 2.9 |

Remarks:
d. c. ratio (dimensional contraction ratio) = (a length of a formed workpiece - a length of a formed product after firing)/(a length of the formed workpiece) × 100(%).
abbreviation:
ex. 1 = example 1 of production
conv. ex. = conventional example;
c. s. = compressive strength;
oil ret. = oil retention characteristic;
vol. res'st = volume resistivity;
fr'ctn coeff. = friction coefficient; and
hyg'oscop. = hygroscopicity.

Compressive strength was measured by conducting tests on testpieces in a columnar shape of 5 mm (diameter)×12.5 mm (height). Oil retention characteristic is indicated by a ratio of weight of lubricating oil to that of the testpiece as measured by means of centrifugal separation of the lubricating oil from the testpiece impregnated with the lubricating oil as deaerated at 1150 rpm for 45 seconds. Hygroscopicity was measured by heating the testpiece at 150° C. for 6 hours, and treating the same in a vacuum desiccator for 20 hours before leaving the same in a room at room temperature for 72 hours.

Table 3 shows friction coefficient.

TABLE 3

| load | 50 Hz |
|---|---|
| 10N* | 0.19–0.26 |
| 50N* | 0.33–0.4 |

TABLE 3-continued

| load | 50 Hz |
|---|---|
| 10N# | 0.16–0.22 |
| 50N# | 0.27–0.34 |

Remarks:
*without lubricating oil;
with lubricating oil

Tests were conducted on a retainer fabricated based on the example 1. Friction coefficient was found by use of a SRV tester at 1 mm stroke at room temperature, using a steel ball 10 mm in diameter, and applying a load either 10N or 50N.

CONVENTIONAL EXAMPLE 75 g of degreased bran derived from rice bran was mixed and kneaded with 0.5 g of water and 25 g of a phenol resin (resol) in a liquid state, a mixture was dried, and a plastic mixture thus obtained was pressure-formed into the shape of a bearing retainer at a pressure of 22 MPa. A mold was at a temperature of 150° C.

A formed mixture was taken out of the mold, heated in a nitrogen atmosphere at a warming rate of 1° C./min up to 500° C., and sintered at 900° C. for about 120 min.6

Subsequently, the temperature of the formed mixture was lowered at a cooling rate in a range of 2 to 3° C./min up to 500° C., and upon the temperature dropping to 500° C. or lower, the formed mixture was left to cool by itself. Table 2 shows properties thereof.

Thus, it has been confirmed that the porous material suitable for use in the bearing retainer according to the invention has novel properties not observed of the conventional material, such as a small contraction ratio of the dimensions of a formed workpiece to those of a finished product, excellent hot oil resistance, small thermal strain, insusceptibility to damage, light weight, a long service life, and still ability to retain oil and grease for a long period of time.

What is claimed is:

1. A porous material suitable for use in a bearing retainer, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a 60-mesh screen, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

2. A porous material suitable for use in a bearing retainer according to claim 1, wherein the thermosetting resin is one kind or not less than two kinds selected from the group consisting of a phenol resin, diaryl phthalate resin, unsaturated polyester resin, epoxy resin, polyimide resin, and triazine resin.

3. A porous material suitable for use in a bearing retainer according to claim 1, wherein a mixing ratio of the degreased bran to the thermosetting resin is 50~90:50~10 by weight.

4. A porous material suitable for use in a bearing retainer as set forth in claim 1, wherein a mixing ratio of the carbonized powders to the thermosetting resin is 50~90:50~10 by weight.

5. A porous material suitable for use in a bearing retainer as set forth in claim 1, wherein a particle size of the carbonized powders is in a range of 50 to 250 μm.

6. A porous material suitable for use in a bearing retainer as set forth in claim 1, wherein the thermosetting resin mixed with the degreased bran is in a liquid state, and the thermosetting resin mixed with the carbonized powders is in a solid state.

* * * * *